I. F. Thompson.
Rasp.

Nº 107,565.    Patented Sept. 20, 1870.

Witnesses
Edward Griffith.
Edmund H. Nevins.

Inventor
Ira F. Thompson.
by his Attorney.
Frederick Curtis.

United States Patent Office.

IRA F. THOMPSON, OF PROVIDENCE, RHODE ISLAND.

Letters Patent No. 107,565, dated September 20, 1870.

IMPROVEMENT IN RASPS.

The Schedule referred to in these Letters Patent and making part of the same.

*To all to whom these presents shall come:*

Be it known that I, IRA F. THOMPSON, of the city and county of Providence and State of Rhode Island, have made an invention of certain Improvements in Rasps for various purposes; and do hereby declare the following to be a full, clear, and exact description thereof, due reference being had to the accompanying drawing making part of this specification, and in which—

Figure 1 is a perspective view of a rasp, in which my invention, in one of its forms, is embodied, while

Figure 1:
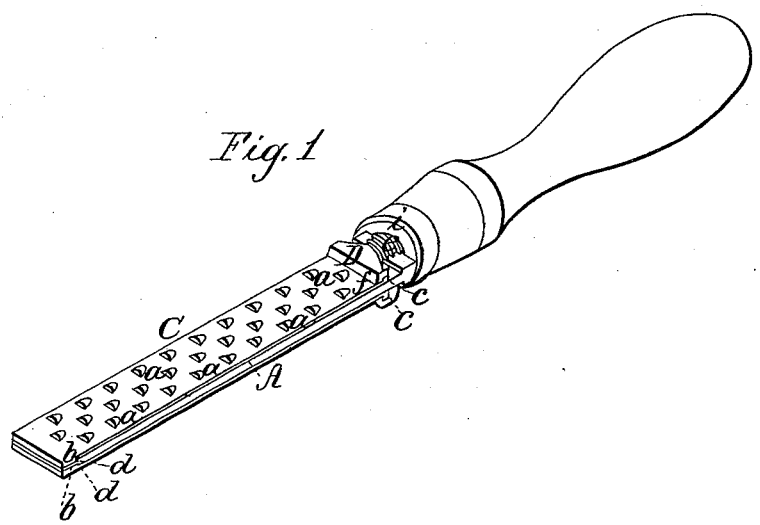

The invention comprising the subject-matter of this patent relates to a novel construction of a rasp, and, perhaps, some species of files, whereby the cutting-faces of such instrument may be made much more lasting and effective than at present, and when worn out may be renewed at small cost and with very little labor.

The invention consists, primarily, in the employment of a permanent shank or bar and outlying or overlapping toothed plates, the latter being applied to the former in an adjustable manner, or so as to be readily attached to or removed therefrom, in manner and for the purpose as hereinafter explained.

In the drawing before alluded to as accompanying this specification, and which illustrates my invention—

A denotes a long, narrow, and thin bar of metal, of about the size and shape of rasps as now generally used, such bar constituting the base or shank of the instrument, and which, in practice, I form of iron, as answering the purpose equally as well as steel, and being of much less cost.

The shank A has a tapering prong, B, for insertion within a proper handle.

One of the movable cutting-plates which I adopt in carrying out my invention is shown at C, in the drawing, as composed of a thin flat ribbon of steel, of about equal length with the bar A, before mentioned.

As shown in fig. 1 of the drawing, the teeth of these plates are shown, at *a a*, &c., as composed of alternating rows of thin, semi-conical, concavous projections, struck up from the inside of the ribbon, by a suitable die or punch, in such manner as to present a series of sharp curved teeth of the best practical form for rasping or reducing a horse's hoof, or other substance to which the instrument may be applied, the concavities of the teeth forming receptacles for the matter thus cut away, and aiding, to a great extent, the free and effective working of the implement.

Figure 2:
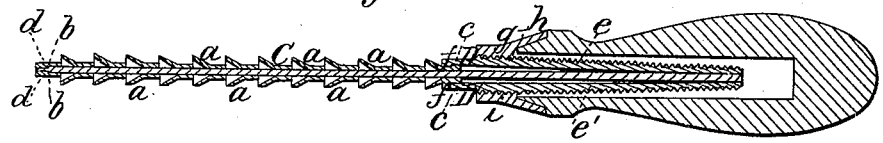
Figure 2 is a longitudinal section of the same.

The above-mentioned ribbons of steel may be applied to the shank A of the rasp in various ways, as, for instance, they may be secured thereto by screws with countersunk heads, or they may be soldered directly to such shank, or they may be held in place in any other suitable manner. For many reasons, however, I prefer to apply the cutting-plates to the shank, as shown in fig. 2 of the accompanying drawing, that is, I affix to or form upon each end of each cutting-plate, and upon opposite sides thereof, a shallow ledge or catch, *b* or *c*, while upon the outer end of each side of the shank A I cut two shallow depressions or notches, *d d*, for reception of one of the catches of each cutting-plate, which lock into them, as shown in fig. 2 of the drawing.

D D' in the drawing represent two jaws, provided with semi-cylindrical shanks, *e e'*, upon which a male screw, or portion of the threads of a screw, is cut, the said jaws being provided with a hook or catch, *f*, similar to those of the plate C, such catch *f* being to overlap and take into one of the teeth of one of the plates C C, before described.

The handle of the instrument is shown at E as made substantially in the usual form of such articles, except that it is provided internally with a tubular sleeve, *g*, upon which is cut a female screw, *h*, for inclosing and encompassing the shanks *e e'* of the jaws D D'.

It will be evident that, upon screwing the handle E upon the semi-shanks *e e'*, until the ferrule *j* of such handle comes in contact with the shoulders produced at the junction of the shank A and its prong B, any further advance of the handle will exert a powerful draft or tension upon the cutting-plates C C, sufficient to maintain them securely in position under all conditions of service. This mode of securing the cutting-plates to the shank, while being durable and effective, allows them to be readily detached therefrom if occasion requires.

Although in the present instance I have represented a given form and disposition of the teeth *a a*, &c., it will be evident to mechanics, to whom this specification is chiefly addressed, that various modifications may be made of the same without affecting the characteristic feature of my invention, which, as before prefaced, consists in the adaptation of movable cutting-plates, applied longitudinally to a permanent bar or shank.

Although in the annexed drawing the teeth *a a*, &c., are so produced and arranged as to present their cutting-edges in one direction, and longitudinally of and at right angles to the longest plane of the plate, I have contemplated several modifications in the production and disposition of such teeth. For instance, alternate rows of teeth may present their cutting-faces in opposite directions to the next adjacent row, and the cutting-faces of such teeth may be placed obliquely to the longest axis of the plate. Under the alternate disposition of the teeth last mentioned, when one series of the same becomes worn out, the plates may be reversed end for end, which will double the capacity of the instrument.

Figure 3:
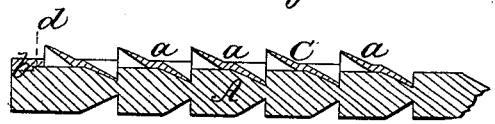
Figure 3 is a longitudinal section of a rasp, exhibiting modifications of my invention.

I have contemplated making a disposition of the cutting-teeth shown in fig. 3 of the accompanying drawing. In this instance I produce a duplicate series of teeth, struck up from the opposite side of the plate, the cutting-faces of both series of teeth being produced by the same puncture of the metal, and being in alignment with each other, but, as a matter of necessity, presenting their cutting-edges in opposite directions. When the series of teeth upon one side of the plate becomes worn, such plate is to be removed from the shank A, and so reversed as to present the opposite series of teeth outermost.

Under this last-mentioned formation and classification of teeth, the shank A is to be provided with a corresponding series of cavities or depressions for receiving the said teeth. For certain species of rasps, the steel plates C C may be very thin, in which case the teeth produced therefrom will preserve a cutting-edge for a great length of time.

Should it become necessary to employ a thicker plate of steel in order to obtain sufficient strength at the base or support of the teeth, the outer extremities of these teeth, for some distance, are to be reduced considerably in thickness, in order to acquire and maintain a cutting-edge. This reduction of the tooth is to be accomplished by the same agency and at the same time with the striking up of the tooth.

I would remark that the principle of my invention does not preclude the making of tapering or convex, or even round rasps, as these may be produced with equally good results, if not with equal economy, as compared with a flat rasp.

In practical adaptation of my invention to the manufacture of coarse files, in which it may be found to possess great advantages, I have contemplated the employment of a cylindrical cutter or bur, composed of a series of annular cutters, combined into one general bur, in such manner that one of the movable plates, hereinbefore described, upon being subjected to the action of such cutters, shall have its entire series of teeth cut at one movement or passage of such plate under or past the cutters.

In order that these revolving cutters may be compelled to produce the proper angular under-cut necessary to produce teeth of this most desirable form, they should vary gradually in diameter from and between the two outermost ones, and should be so arranged upon a mandrel or arbor that, upon tilting the whole series in one direction thereupon, and revolving them in contact with a grindstone, their peripheries shall be reduced to a sharp and angular cutting-edge, and by tilting them in the reverse direction, they shall be brought to their normal working position, with their cutting-edges properly presented for cutting the teeth upon the blank plates.

One resulting advantage of the adoption of the invention above described will be found in the fact that I am enabled to produce the teeth of rasps not only more perfect, but vastly more durable, than have hitherto been made.

In addition to this advantage of my invention, another source of economy in its use consists in the low cost of the cutting-plates as compared with a rasp of ordinary manufacture, as it will be evident that a pair of these plates is equal to, and in fact of much more value, than an ordinary rasp which is composed entirely of steel. As these cutting-plates are produced by machinery, in exact duplications and in great numbers, at very small cost, a person possessing one shank may be enabled to renew its effectiveness by the changing of its movable plates, the saving to him in the expense being not only the difference between the cost of an entire steel rasp as compared with that of a pair of cutting-plates, as before described, but as between the efficiency and durability of the ordinary teeth as compared with those shown in my invention.

*Claims.*

I claim as my invention and desire to secure by Letters Patent of the United States, as follows:

1. As an improved manufacture, a rasp or file composed of a permanent shank or base, and one or more removable cutting-plates applied to the same, substantially as and for the purpose set forth.

2. The mode of confining the cutting-plates of a rasp or file, when made as before explained, to its shank or base, by means of the projections $b$ and $d$, or their equivalents, and sectional screws $e\ e'$, and the latter being enveloped and actuated by the handle of the file, or its equivalent, and the whole being in manner and for the purpose substantially as before explained.

IRA F. THOMPSON.

Witnesses:
 FRED. CURTIS,
 EDWARD GRIFFITH.